July 4, 1972   U. STAIGER   3,674,350
VIEWER
Filed April 16, 1970   2 Sheets-Sheet 1

ULRICH STAIGER
INVENTOR.

BY John D. Hussey
Robert W. Hampton
ATTORNEYS

July 4, 1972 U. STAIGER 3,674,350
VIEWER
Filed April 16, 1970 2 Sheets-Sheet 2

ULRICH STAIGER
INVENTOR.

BY John D. Husser
Robert W. Hampton
ATTORNEYS

United States Patent Office 3,674,350
Patented July 4, 1972

3,674,350
VIEWER
Ulrich Staiger, Stuttgart-Sillenbuch, Germany, assignor to Eastman Kodak Company, Rochester, N.Y.
Filed Apr. 16, 1970, Ser. No. 29,212
Claims priority, application Germany, June 21, 1969,
P 19 31 648.4
Int. Cl. G03b 23/08
U.S. Cl. 353—27
11 Claims

ABSTRACT OF THE DISCLOSURE

Apparatus is disclosed for simultaneously projecting any two separate images selected from a multiple-image-bearing medium. Two optical projecting devices are provided, each of which includes an illuminating source and an optical deviating element for redirecting light emanating from the illumination source so that it passes through the multiple-image-bearing medium in a direction substantially perpendicular to the surface of the medium. Projection lenses are provided on the opposite side of the medium from the illuminating sources to form an image of the information contained on the medium. At least one of the projecting devices, including its cooperating lens, is movable and therefore effective to project different images selected from the multiple-image-bearing medium. In a preferred embodiment, the projected image produced by each optical projecting device can be displayed upon separate display screens.

CROSS-REFERENCES TO RELATED APPLICATIONS

Reference is made to commonly assigned copending U.S. patent application Ser. No. 875,815, entitled "Reader for Information Carriers in Sheet Form," filed Nov. 12, 1969 in the names of Heinz Streicher, Siegfried Riek, and Manfred Leutwein; and commonly assigned copending U.S. patent application Ser. No. 875,792, entitled "Reader for Information Carriers in Sheet Form," filed Nov. 12, 1969 in the names of Manfred Leutwein and Heinz Streicher.

BACKGROUND OF THE INVENTION

Field of the invention

This invention relates to apparatus for projecting images onto a surface and more particularly to projection apparatus for simultaneously projecting at least two images onto a display surface from the same multiple-image-bearing medium.

Description of the prior art

Multiple-image microfilm sheets involving subjects from the fields of science, technology, or legal protection of industrial property (patents), held for example in the aperture of an index card generally take the form of a text or specification portion and an illustrative portion including drawings, formulas or the like related to the text portion. In order to understand the contents of the stored information, it is not only desirable but indeed often necessary to view the text portion and the illustrative portion in a contiguous or close relationship so that the observer may readily direct his attention from the text to the illustrative portions. In such cases it would be desirable to view together at least two images at the same time from the multiple-image microfilm sheet.

As exemplified by German Pat. No. 758,907 and British Pat. No. 1,112,493, projection devices of the type for projecting two images simultaneously from information-bearing media are well known in the art.

In British Pat. No. 1,112,493 there is disclosed a motion picture stereo projector which projects dual images from stereo pairs that are situated side by side on a film strip. The device utilizes a dual projection system having a single light source. Light emanating from that source is divided into two separate beams or "pencils of light" by a pair of triangular prisms. However, there is no disclosure of relative movement between the two optical centers of the dual system.

The apparatus described in German Pat. No. 758,907 is a stereo projection device which employs a "convergent arrangement" consisting of a pair of optical deviating elements and is capable of projecting stereoscopic pairs onto a common display screen, projecting single frames simultaneously onto separate but adjacent areas of a display screen, or projecting single frames separately onto a display screen. Each embodiment disclosed has a pair of film holders or film gates for accommodating single-frame originals, which film gates are rigidly connected with their respective optical projection systems. There is no disclosure of a device for the selective projection of two or more images simultaneously from a single multiple-image microfilm sheet.

It is therefore apparent that the known viewers permit only limited utilization of microfilm information arranged in a series of frames on a carrier sheet. This is due in part to the dimensions of the currently available optical components which do not allow optical projection systems of the traditional type to be arranged close enough together to project images from the customary 1 centimeter by 1.5 centimeter microfilm frames positioned side by side or one above the other on the same carrier sheet.

SUMMARY OF THE INVENTION

Accordingly, it is a principal object of this invention to selectively project any two separate images from a plurality of images arranged in series on a carrier sheet onto a display surface or surfaces simultaneously so as to permit ready observation and comparison of the displayed information.

This and other objects are met in accordance with the teachings of this invention by providing apparatus for projecting at least two images from a multiple-image-bearing medium. The projection apparatus includes at least two optical projection systems, at least one of which is movable with respect to the other, and both being constructed and located so that there is no physical interference between the two when positioned for projecting adjacent images from the medium. In the light path of at least one of the projection systems is provided optical deviating means for redirecting light rays from the illumination source of that projection system so that the rays will be substantially perpendicular to the information-bearing medium when passing therethrough. In a preferred embodiment of the invention, both optical projection systems are provided with optical deviating means located in their light paths, each system being movable with respect to the other and with respect to the information-bearing medium supported in the projection plane of the apparatus.

The invention, and its object and advantages, will become more apparent in the detailed description of the preferred embodiment presented below in conjunction with the accompanying drawings.

DESCRIPTION OF THE PREFERRED EMBODIMENT

Figure 2:
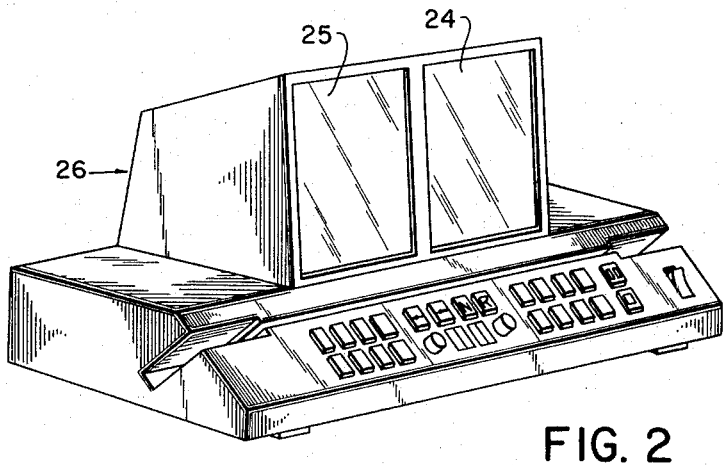
FIG. 2 is a perspective view of a microfilm reader or viewer of the type in which this invention can be incorporated.
Figure 1:
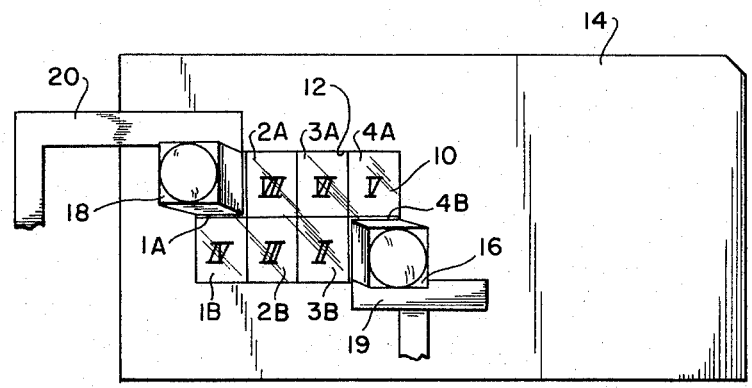
FIG. 1 is a schematic illustration showing a portion of two optical projection systems of a microfilm reader positioned for projecting images from an information-bearing medium in accordance with the teachings of this invention.

Referring now to the drawings and in particular to FIG. 1 there is shown an information-bearing medium or microfilm chip 10 fitted in the aperture or window 12 of an information carrier sheet of aperture card 14. Film chip 10 contains a number of image frames arranged in two rows A and B wihch are designated for illustration purposes as 1A, 2A, 3A, 4A and 1B, 2B, 3B, 4B. Also depicted in FIG. 2 are a pair of light projecting assemblies 16 and 18 which are part of optical projection systems 15 and 17 as more clearly illustrated in FIG. 3. Light projecting assembly 16 is shown in place for projecting an image from frame 4B while light projecting assembly 18 is shown in place for simultaneously projecting an image from frame 1A. Projecting assemblies 16 and 18 are supported by members 19 and 20 so that either or both assemblies are movable with respect to the other and with respect to film chip 10 to facilitate the selective simultaneous or dual projection of images from any two of the eight frames contained on film chip 10.

Although the dual images can be projected onto any suitable surface, in a preferred embodiment in which projecting systems 15 and 17 are incorporated into a microfilm viewer or reader such as microfilm reader 26 as illustrated in FIG. 2, the dual images are projected onto a pair of display screens 24 and 25. Such a reader is disclosed in the above-referenced copending U.S. application Ser. No. 875,815, filed on Nov. 12, 1969, in the names of Streicher, Riek and Leutwein, and the above-referenced copending U.S. application Ser. No. 875,792, filed on Nov. 12, 1969 in the names of Leutwein and Streicher.

As can be seen in FIG. 1, projecting assembly 16 is tilted downward and to the right with respect to the projection plane occupied by film chip 10 and index card 14 while projecting assembly 18 is tilted upward and to the left. Such orientations are to facilitate the use of currently available optical components in the construction of optical projection systems 15 and 17 while still providing for these systems to be positioned in a close relationship as was previously discussed.

Figure 3:
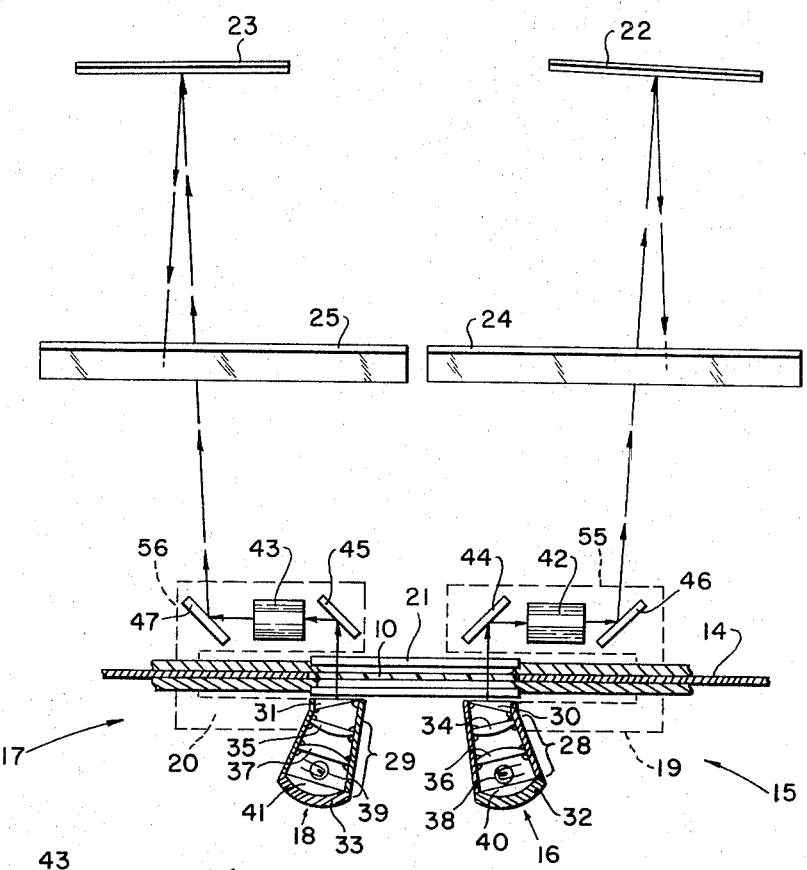
FIG. 3 is a schematic view showing the optical projection systems of a prefered embodiment of this invention.

Referring now to FIG. 3 of the drawings, optical projection systems 15 and 17 and aperture card 14 are shown schematically in a top view in a microfilm reader such as, for example, reader 26 as illustrated in FIG. 2. Also depicted are a film gate 21, mirrors 22 and 23 and display screens 24 and 25 positioned relative to projection systems 15 and 17 and card 14. In accordance with a preferred embodiment of the invention the elements of optical projection system 15 are illustrated as a light projecting assembly 16 on one side of film gate 21 and a projection lens 42 and a pair of mirrors 44 and 46 on the opposite side of film gate 20. In addition to the usual illuminating means 28, light projecting assembly 16 also includes within housing 32 an optical deviating means 30, to be described below. Illuminating means 28 is of the type generaly known to those skilled in the art and includes a pair of condenser lenses 34 and 36, a projection lamp 38 and a reflector 40.

The elements of projection system 17 are identical to those of projection system 15 and include a light projecting assembly 18 on the same side of film gate 21 as light projecting assembly 16 and a projection lens 43 and a pair of mirrors 45 and 47 on the opposite side of film gate 21. Projecting assembly 18 also includes an optical deviating means 31 in addition to the usual illuminating means 29 enclosed within housing 33. Illuminating means 29 includes a pair of condenser lenses 35 and 37, a projection lamp 39 and a reflector 41.

In operation, light projected from light projecting assemblies 16 and 18 is directed to projection lenses 42 and 43 by mirors 44 and 45, respectively, after passing through film chip 10 and film gate 21. Projection lenses 42 and 43 then form an image on display screens 24 and 25 via mirrors 46 and 22 and mirrors 47 and 23, respectively.

Figure 4:
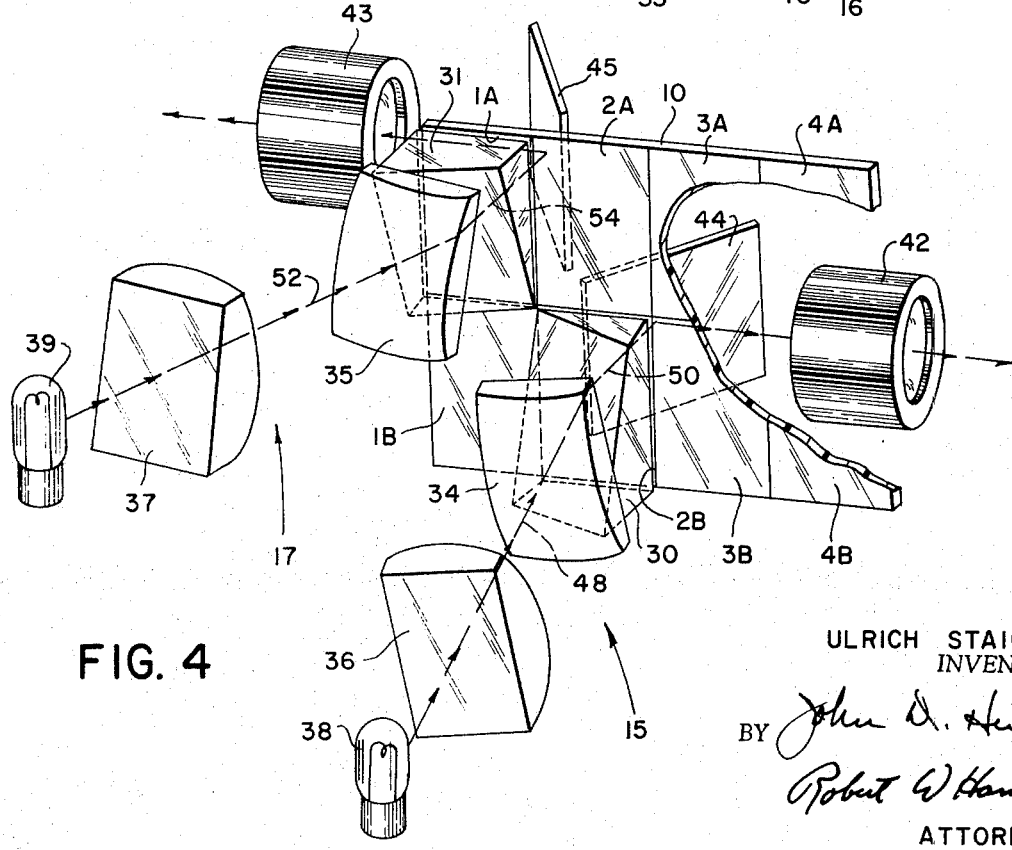
FIG. 4 is a pictorial view of various elements of the two optical projection systems depicted in FIG. 3.

Various elements of projection systems 15 and 17 are shown schematically in FIG. 4 in relation to film chip 10. Those parts not required for the understanding of the invention have been omitted from the drawing for the sake of clarity. Since light projecting assemblies 16 and 18 (FIGS. 1 and 3) are tilted with respect to the projection plane of the reader as was previously described, it therefore follows that the optical axes of illuminating means 28 and 29 intercept the projection plane at an oblique angle. As is well known, it is desirable for the light rays passing through an image-bearing medium to be substantially perpendicular to the medium to minimize distortion in the resulting projected image. It is therefore necessary to redirect the light emanating from illuminating means 28 and 29 so as to pass through film chip 10 in a direction that is approximately at a 90° angle to the surface thereof. To accomplish this, optical deviating means or elements 30 and 31 are provided and are located in the light path of illuminating means 28 and 29 as shown in FIGS. 3 and 4 to be effective to bend light rays incident onthe deviating elements 30 and 31 so that the rays refracted thereby are substantially perpendicular to the reader projection plane.

As can be seen in FIG. 4, therefore, light rays emanating from lamp 38 of projection system 15 are directed along optical axis 48, passing through condenser lenses 36 and 34 and becoming incident upon optical deviating element 30. Upon passing through deviating element 30 the light rays are refracted to the right and downward and directed along axis 50 which is substantially perpendicular to the projection plane occupied by film chip 10. After passing through film chip 10 the light rays are reflected by mirror 44 to projection lens 42 which in turn produces an image on a display screen in a manner as was described in conjunction with FIG. 3. The operation of projection system 17 is similar in that light rays emanating from projection lamp 39 are directed along axis 52, passing through condenser lenses 37 and 35 to optical deviating element 31 where they are refracted upwards and to the left so as to pass along axis 54 which is also substantially perpendicular to the projection plane occupied by film chip 10. The light rays are then reflected by mirror 45 to projection lens 43 which also forms an image in a manner as was described in conjunction with FIG. 3.

Figure 5:
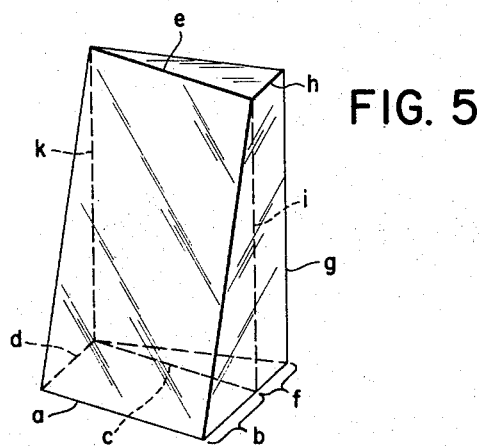
FIG. 5 is an enlarged perspective view of a typical optical deviating element of the type used in the two optical projection systems illustrated in FIG. 4.

A typical optical deviating element such as is used in projection systems 15 and 17 is illustrated in FIG. 5. In the preferred embodiment the deviating element takes the form of a double prism which in effect results from joining together two triangular prisms turned 90° relatively to each other; one triangular prism has base $a$, $b$, $c$, $d$ and refracting edge $e$ and the other prism the base $f$, $g$, $h$, $i$ and refracting edge $k$. It may therefore be advantageous with regard to manufacture to cement separately made triangular prisms together in pairs although the invention is not limited to this method of construction. The area of the double prism face adjacent the projection plane corresponds roughly to the area of one of the image frames contained on film chip 10, i.e., an area of approximately 1 centimeter by 1.5 centimeters.

As indicated in FIG. 3, the individual elements of projection system 15 are connected by a movable common support 55, thereby making all elements movable as a unit. Likewise, the elements of projection system 17 are connected by a movable common support 56 so that they are movable as a unit. Common supports 55 and 56, including members 19 and 20, respectively, are illustrated schematically in FIG. 3 by dashed lines. Although supports 55 and 56 can take various forms, one such set of supporting means is described in the above-referenced copending Streicher et al. application Ser. No. 875,815. Although the preferred embodiment of the invention includes two optical projection systems which are mounted on separate movable supports, in an alternative embodiment (not shown) either of the projection systems, 15 or 17, may be fixedly mounted within the reader while the other is movable relative thereto without departing from the scope of the invention.

Because of the angle at which light projecting assemblies 16 and 18 are mounted with respect to the projection plane of the reader, as was previously described, the elements contained within housings 32 and 33 can be arranged and assembled with a minimum of difficulty and without substantial restriction due to physical interference resulting from the commercial dimensions of these elements. Additionally, such an arrangement enables optical projection systems 15 and 17 to be displaceable at least in the region of an aperture card window containing a multiple-frame microfilm chip, thereby providing the capability of projecting simultaneously any two selected image frames from the film chip, regardless of whether the respective frames are adjacent or displaced from each other or whether they are side-by-side or one above the other.

Although the above invention has been described for use with a reader of the type disclosed in the above-referenced copending applications, it is to be understood that the disclosed projection systems are not limited to use with the disclosed readers but can be adapted for any kind of device where there is a desire or necessity to view simultaneously two or more images from a multiple-image-bearing medium.

The invention has been described in detail with particular reference to a preferred embodiment thereof, but it will be understood that variations and modifications can be effected within the spirit and scope of the invention.

I claim:

1. Apparatus for simultaneously projecting at least two images from an image-bearing medium having a plurality of image-bearing portions, said apparatus comprising:
   means for supporting an image-bearing medium having a plurality of image-bearing portions in a projection plane of said apparatus;
   first illuminating means positioned for directing light rays toward the projection plane of said apparatus at an oblique angle with respect to the projection plane;
   first optical deviating means for redirecting said light rays from said illuminating means so as to pass through the projection plane substantially perpendicular thereto in a first region of said plane;
   first supporting means for movably supporting said first illuminating means and said first optical deviating means for movement in unison relative to said projection plane;
   second illuminating means positioned for directing light rays toward the projection plane of said apparatus at an oblique angle with respect to the projection plane;
   second optical deviating means for redirecting said light rays from said illuminating means so as to pass through the projection plane substantially perpendicular thereto in a second region of said projection plane; and
   second supporting means for supporting said second illuminating means and said second optical deviating means for movement relative to the projection plane of said apparatus.

2. The apparatus of claim 1 including a first projection lens located on the opposite side of the projection plane from said first optical deviating means and operatively associated with said first optical deviating means and supported by said first supporting means for movement in optical alignment with said first deviating means and also including second projection lens means located on the opposite side of the projection plane from said second optical deviating means and operatively associated with said second optical deviating means and supported by said second supporting means for movement in optical alignment with said second optical deviating means.

3. The apparatus of claim 2 wherein said first supporting means supports said first illuminating means, said first optical deviating means and said first projection lens means as a unit for movement with respect to said projection plane and wherein said second illuminating means, said second optical deviating means and said second projection lens means are supported by said second supporting means as a unit for movement with respect to the projection plane of said apparatus.

4. The apparatus of claim 1 wherein said optical deviating means includes two adjacent optical wedges.

5. In apparatus for projecting images from a multiple-image-bearing medium supported in the projection plane of said apparatus, the improvement comprising:
   first illuminating means for directing light along a first optical axis, said first illuminating means being mounted with its optical axis at an oblique angle with respect to the projection plane of said apparatus;
   first optical deviating means positioned for intercepting the light from said first illuminating means and for redirecting the light along an axis perpendicular to said projection plane; and
   first supporting means for supporting said first illuminating means and said first optical deviating means for movement in unison relative to the projection plane of said apparatus.

6. The apparatus of claim 5 including first projection lens means positioned on the opposite side of said projection plane from said first optical deviating means and supported by said first supporting means for movement in optical alignment with said first optical deviating means in response to movement of said first optical deviating means.

7. The apparatus of claim 6 wherein said first illuminating means, said first optical deviating means and said first projection lens means are supported for movement as a unit by said supporting means relative to the projection plane of said apparatus.

8. The apparatus of claim 5 further including second illuminating means for directing light along a second optical axis, said second illuminating means being mounted with its optical axis at an oblique angle wth respect to the projection plane;
   second optical deviating means positioned for intercepting the light from said illuminating means and for redirecting the light along an axis perpendicular to the projection plane; and
   second supporting means for supporting said second illuminating means and said second optical deviating means.

9. The apparatus of claim 8 wherein said second supporting means is movable relative to said projection plane.

10. The apparatus of claim 9 further including second projection lens means located on the opposite side of the projection plane from said second optical deviating means and in optical alignment with said second optical deviating means and supported by said second supporting means.

11. The apparatus of claim 10 wherein said second supporting means supports said second illuminating means, said second optical deviating means and said second projection lens means for movement as a unit with respect to said projection plane.

References Cited

UNITED STATES PATENTS 3,183,765   5/1965   Offensend et al. ----- 353—94 X

FOREIGN PATENTS 945,791   7/1956   Germany ------------ 353—7

WILLIAM D. MARTIN, JR., Primary Examiner

U.S. Cl. X.R.

353—94